United States Patent [19]

Bean et al.

[11] 4,285,923
[45] Aug. 25, 1981

[54] MANUFACTURE OF CALCIUM NITRITE SOLUTIONS WITH LOW NITRATE CONTENT

[75] Inventors: Samuel L. Bean, Jamesville; Philip F. Seeling, North Syracuse; Robert J. Hoffman, Liverpool; William W. Low, Syracuse, all of N.Y.

[73] Assignee: Allied Chemical Corporation, Morris Township, Morris County, N.J.

[21] Appl. No.: 960,820

[22] Filed: Nov. 15, 1978

[51] Int. Cl.³ .............................................. C01B 21/20
[52] U.S. Cl. .................................... 423/385; 423/235
[58] Field of Search ................................. 423/235, 385

[56] References Cited

U.S. PATENT DOCUMENTS

| | | | |
|---|---|---|---|
| 1,070,070 | 8/1913 | Rothe | 423/385 |
| 3,928,543 | 12/1975 | Gregory et al. | 423/385 |
| 4,009,246 | 2/1977 | Wendel | 423/385 |
| 4,208,391 | 6/1980 | Endo et al. | 423/385 |

FOREIGN PATENT DOCUMENTS 5159793  5/1976  Japan ...................................... 423/385

Primary Examiner—O. R. Vertiz
Assistant Examiner—Wayne A. Langel
Attorney, Agent, or Firm—Thomas D. Hoffman; Alan M. Doernberg

[57] ABSTRACT

Calcium nitrate with low nitrate content is prepared by reacting in a series of absorption reactors lime slurry and nitrogen oxide gases. The lime slurry flows serially through the series of absorption reactors with a major portion being recycled to the inlet of a Venturi absorber in each reactor. Nitrogen oxide gases flow cocurrently with the slurry from each reactor to the following Venturi inlet and are contacted by recycle slurry in each Venturi with a molar ratio of calcium hydroxide to nitrogen oxides of at least about 20. Slurry from the last reactor with a calcium nitrite content of below about 22 weight percent and a calcium hydroxide content of at least about 2 weight percent may be freed of unreacted calcium hydroxide, for example by treatment with $NO_x$ gases, and then concentrated to the desired product concentration. The exit gases may be scrubbed with incoming lime slurry after passing through a holdup vessel which increases the ratio of $NO_2$ to NO.

10 Claims, 2 Drawing Figures

MANUFACTURE OF CALCIUM NITRITE SOLUTIONS WITH LOW NITRATE CONTENT

BACKGROUND OF THE INVENTION

It is known to prepare calcium nitrite by reacting calcium hydroxide with a gaseous mixture of nitrogen oxide gases. Mixtures of NO and $NO_2$, such as are produced by the oxidation of ammonia, are used with a preferred mol ratio of $NO:NO_2$ of at least about 1.0, especially about 1.0 or slightly above. Excess $NO_2$ causes calcium nitrate to be coproduced in substantial quantities. For the desired enduses, this coproduct is undesirable.

There are several problems in applying the above reaction to commercial operation. First, gaseous emissions of nitrogen oxide gases are severely limited by environmental considerations. Second, because of the limited solubility of calcium hydroxide in water, the reaction thereof with nitrogen oxide gases is far more rate-limited than the corresponding reaction of sodium hydroxide to form sodium nitrite. Third, attempts to reproduce reported experiments for the production of calcium nitrite result in substantial calcium nitrate impurity levels.

BRIEF DESCRIPTION OF THE INVENTION

The present invention includes a combination of process steps and conditions wherein the calcium nitrate impurity levels in the manufacture of calcium nitrite are minimized. The relative levels of calcium nitrite and calcium nitrate are expressed herein as a weight ratio which is desirably as high as possible.

Thus the present invention includes a process of producing an aqueous calcium nitrite solution low in calcium nitrate comprising the steps of:

(a) feeding an aqueous lime slurry of about 10-20 weight percent calcium hydroxide to at least two absorption reactors in series;

(b) feeding into the first absorption reactor a gaseous mixture of nitrogen oxide gases having a % state of oxidation of about 40-50% according to the formula $$\text{percent state of oxidation} = \frac{\text{mols } eNO_2}{\text{mols NO} + \text{mols } eNO_2} \times 100$$

Where $eNO_2$ is determined by adding two times the number of mols of $N_2O_4$ to the number of mols of $NO_2$;

(c) feeding the gaseous effluent from each absorption reactor to the next absorption reactor in cocurrent flow with the lime slurry;

(d) contacting the inlet gas of each absorption reactor with lime slurry at a rate wherein the local molar ratio of calcium hydroxide to nitrogen oxides is at least about 20; and (e) maintaining at least about 2 weight percent calcium hydroxide and below about 22 weight percent calcium nitrite in the slurry in each absorption reactor.

If it is desired to concentrate the calcium nitrite to above about 22 weight percent, unreacted calcium hydroxide may be removed from the product and the product may then be concentrated to the desired concentration.

DETAILED DESCRIPTION OF THE INVENTION

The present invention is concerned with the production of an aqueous calcium nitrite solution with a minimum of calcium nitrate coproduction. The two reactants are lime slurry and nitrogen oxide gases. The lime slurry used contains 10 to about 20 weight percent calcium hydroxide. Preferably, this quantity is between about 13 and about 16 weight percent. The calcium carbonate content is preferably below about 6% and more preferably below about 0.5% since calcium carbonate has been found to be much less reactive with nitrogen oxide gases than calcium hydroxide.

Certain commercial sources of lime have been found more desirable than others for use in the present process. It appears that lower calcium carbonate content is the primary factor. For example, one lime batch containing about 96% $Ca(OH)_2$ and about 1% $CaCO_3$, by weight, produced high nitrite to nitrate ratios and 304 grams (0.67 pounds) calcium nitrite per hour in a small scale reactor. This material was used in Example III, Run A. By comparison, a lime batch from a different source containing about 77% $Ca(OH)_2$ and about 20% $CaCO_3$ also produced high nitrite to nitrate ratios, but only at a rate of 254 grams (0.56 pounds) calcium nitrite per hour under similar conditions. This material was used in the remaining Examples. Unreacted calcium hydroxide also settled faster from the crude product (with or without use of a polyelectrolyte settling agent) when a low-carbonate lime was used. Other impurities such as magnesium and iron cations may be present in the lime, but should preferably be minimized.

The temperature of the slurry is not critical, with temperatures of about 30° to 80° C. being convenient because the reaction is exothermic. Since calcium hydroxide is only sparingly soluble in water at these temperatures, it should be understood that appreciable amounts of the calcium hydroxide in the slurry are carried as solid particles. The size of these particles is not critical except in so far as excessively large particles may cause handling problems and are less reactive.

The nitrogen oxide gas mixture used in the present invention contains NO and $NO_2$ and may also contain $N_2O_4$ in equilibrium with $NO_2$. The ratio of NO to effective $NO_2$ or "$eNO_2$" is expressed by the formula for "percent state of oxidation" given in U.S. Pat. No. 3,928,543 as stated above. The percent state of oxidation should be about 40-50%, which corresponds to a $NO:NO_2$ molar ratio (assuming no $N_2O_4$) of between about 3:2 and about 1:1. Preferably the percent state of oxidation is about 45-50% and more preferably about 50%. The feed gas used as reactant is conveniently a commercially available product of a conventional ammonia oxidizer having 5-15 mol percent nitrogen oxides and a major proportion of $N_2$. A representative feed gas contains 60-70% nitrogen, 7-10% nitrogen oxides, 1-5% oxygen, 0-0.5% carbon dioxide and 17-21% water vapor, all by volume. Concentrations of both oxygen and carbon dioxide in the feed gas are preferably minimized as the former can affect the percent state of oxidation and the latter can increase the calcium carbonate concentration in the slurry. In handling outflows from a commercial ammonia oxidizer the retention time at moderate temperatures is preferably minimized, since long retention times can increase the conversion of NO to $NO_2$ and therefore the "percent state of oxidation". Since the retention time in the Examples generally was 1.2 seconds or longer, a condensation step was employed to convert $NO_2$ to $HNO_3$ which was trapped in the condensate so as to lower the "percent state of oxidation" back to about 50%.

Both reactants are fed serially through at least two absorption reactors. The gases introduced into each reactor are rapidly quenched with a flow of lime slurry that produces a local molar ratio of calcium hydroxide to nitrogen oxide gases of at least about 20, and preferably at least about 35 and more preferably between about 50 and about 150. In the system described in the Examples that follow, this local ratio was achieved by recycling lime slurry from each absorption reactor to a Venturi absorber where it is mixed with incoming gases. Thus, in the first absorption reactor a recycle from the bottom of the reactor contacts and quickly quenches incoming nitrogen oxide gases. The recycle flow is large enough to effect a local molar ratio of at least about 35. The gaseous effluent from the first to the second absorption reactor is contacted in a second Venturi with a recycle stream from the bottom of the second reactor large enough to effect a local molar ratio of at least about 20. Similarly, recycle is effected to the gaseous inlet of each subsequent absorption reactor. In addition to the high localized molar ratio and overall cocurrent flow, it has been found that two limits must be maintained in the slurry in each absorption reactor to minimize nitrate formation. First, the calcium hydroxide content of the slurry must be maintained at least about 2 weight percent in all absorption reactors. Second, the calcium nitrite content must not be permitted to exceed about 22 weight percent. In experiments wherein the calcium hydroxide content was permitted to fall below about 2% or wherein the calcium nitrite content was brought above about 22 weight percent, the formation of nitrates increased substantially. Both levels are easily controlled by adjusting the incoming lime slurry concentration and the relative flow rates of the various feeds, recycle streams and other flows.

The apparatus for contacting each incoming gaseous stream and quickly quenching same with lime slurry is preferably a Venturi-type device as described in the Examples and illustrated in the Drawing. Nevertheless, other devices capable of quickly quenching a gas stream with a liquid, such as an arrangement of spray nozzles, packed towers or a combination of these may also be used. The reactors should also be designed to minimize hydrated lime settling as by the use of cone shaped bottoms for the reactors shown in FIGS. 1 and 2.

The combination of process features of the present invention is designed to minimize $NO_x$ emissions while maximizing the nitrite to nitrate ratio. As will be apparent from the Examples, and especially Example 9, it is possible to achieve very high nitrite/nitrate ratios with higher $NO_x$ emissions. Such high ratios and high $NO_x$ emissions were also found in use of a single packed column. The present combination achieves reasonably high nitrite to nitrate levels with very low $NO_x$ emissions levels.

DESCRIPTION OF THE PREFERRED EMBODIMENT

Figure 1:
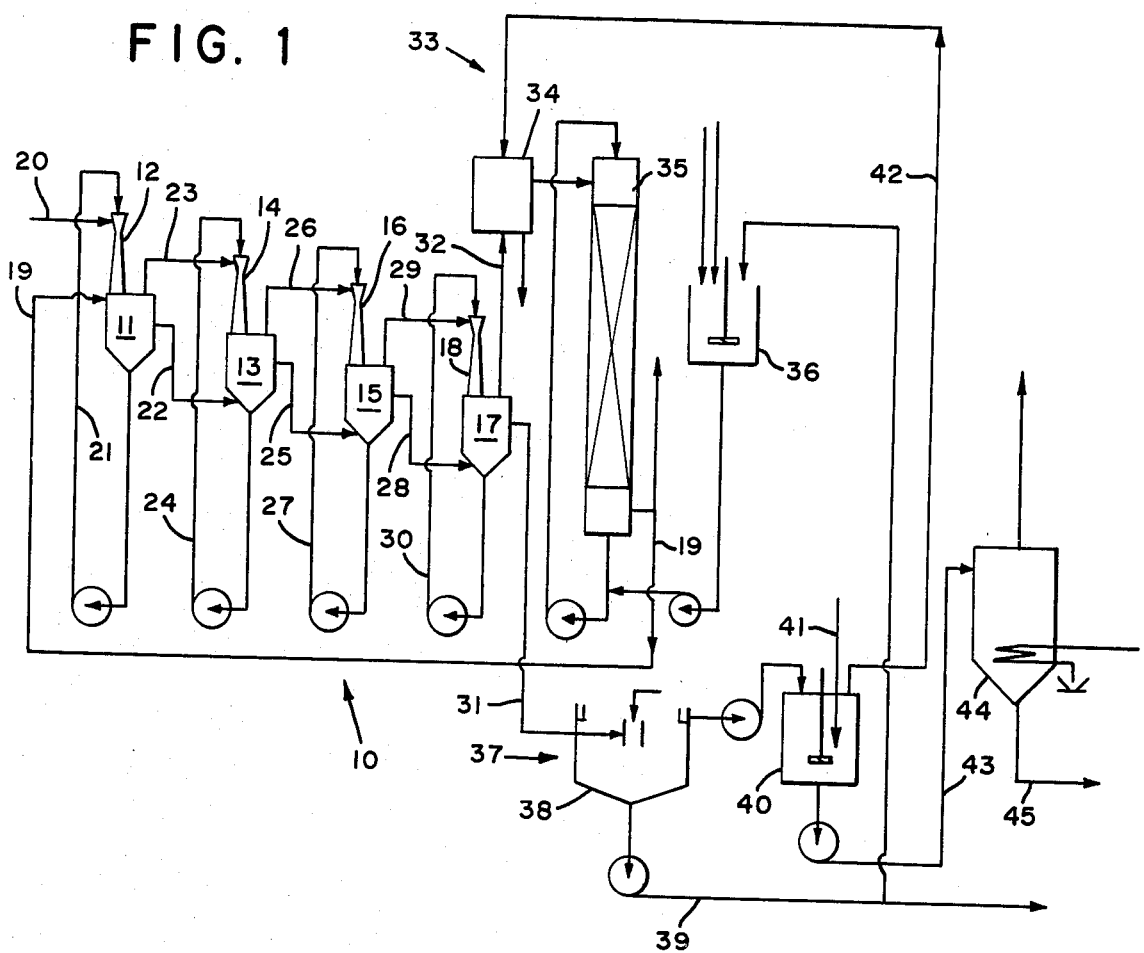
FIG. 1 is a schematic view of the overall process according to the present invention.

FIG. 1 depicts the overall process according to the present invention with sections for absorption (reaction), gas scrubbing and product purification and concentration. An absorption section 10 is shown with four reactors. The first reactor 11 has an inlet Venturi 12. The second reactor 13 has an inlet Venturi 14. The third reactor 15 has an inlet Venturi 16. The fourth reactor 17 has an inlet Venturi 18.

Incoming lime slurry flows into the absorption section 10 through stream 19 into the main portion of the first reactor 11. Incoming nitrogen oxide gases, as produced in a conventional ammonia oxidation system, flows in stream 20 into the inlet Venturi 12 of the first reactor 11. Slurry is recycled and pumped from the bottom of reactor 11 in first recycle stream 21 to the Venturi 12. In Venturi 12, this recycle slurry contacts and quickly quenches the incoming nitrogen oxide gases. Slurry is fed from the main portion of the first reactor 11 to the main portion of the second reactor 13 in stream 22. Gases are fed from the main portion of the first reactor 11 to the Venturi 14 of the second reactor 13 in stream 23. Slurry is recycled and pumped from the bottom of the second reactor 13 through second recycle stream 24 to the Venturi 14 where it contacts and quenches the gases from stream 23. Slurry is fed forward from the main portion of the second reactor 13 to the main portion of the third reactor 15 through stream 25. Gases are fed from the main portion of the second reactor 13 to the Venturi 16 of the third reactor 15 in stream 26. Slurry is recycled and pumped from the bottom of the third reactor 15 through stream 27 into the Venturi 16 where it contacts and quickly quenches the gases from stream 26. Slurry is fed from the main portion of the third reactor 15 to the main portion of the fourth reactor 17 in stream 28. Gases are fed from the main portion of the third reactor 15 to the Venturi 18 of the fourth reactor 17 through stream 29. Slurry is recycled and pumped in stream 30 from the bottom of the fourth reactor 17 to the Venturi 18 where it contacts and quickly quenches the gases entering from stream 29. Crude product slurry flows out of the absorption section in stream 31. The gaseous effluent from the absorption section 10 flows out of the fourth reactor 17 in stream 32.

The desired ratios of recycle slurry to nitrogen oxide gases are maintained in each Venturi by adjusting the various flows and especially the flow of recycled slurry through streams 21, 24, 27 and 30. The concentrations of calcium hydroxide and calcium nitrite are controlled by concentration of incoming lime slurry feed in stream 19 and the flows of lime slurry forward through streams 22, 25 and 28. It will be appreciated that these flows can be controlled by conventional engineering techniques.

The gas in stream 32 passes to a hold tank 34 which is the first portion of the gas purification section 33. It will be appreciated, however, that, since the gas in stream 20 has passed serially through the absorption section 10, it has been depleted of nitrogen oxide gases in each reactor and hence has a lowered nitrogen oxide content. Nevertheless, its content of from about 1 to about 1.5 volume percent nitrogen oxide gases is unacceptable for direct emission to the atmosphere. In hold tank 34 some of the NO will be converted to $NO_2$ so as to make the gases easier to absorb. From hold tank 34, the gases are fed into a packed tower 35 where they are scrubbed with fresh lime slurry, which is recycled though the tower 35 in a closed loop which is fed by fresh slurry from lime slurry makeup tank 36. It will be appreciated that the configuration and flow through the hold tank 34 and the tower 35 is designed to reduce the nitrogen oxide content of the gas as much as possible, preferably to below about 500 volume parts per million and more preferably to below about 200 volume parts per million.

The crude product slurry in stream 31 is purified and concentrated in purification section 37 as follows. In a settler 38 a coagulant is added to the crude slurry and undissolved calcium hydroxide is removed through stream 39 from the bottom of the settler and, depending upon its purity, either recycled (to make up tank 36) or purged. The liquid from the settler 38 is removed to a neutralizer 40 where an acid gas such as a small stream of nitrogen oxide gases is fed through stream 41 into the liquid at a rate whereby a pH of below about 10 is maintained to prevent the formation of $Ca(NO_2)_2 \cdot CaO \cdot 3\frac{1}{2} H_2O$ crystals upon concentration. Where nitrogen oxide gases are used in the neutralizer 40, the gaseous effluent therefrom may be removed from the purification section 37 in stream 42 to the hold tank 34. It should be appreciated that, since the amount of calcium hydroxide dissolved in the slurry in neutralizer tank 40 is relatively small, relatively little acid gas need be used and, if the acid gas is a mixture of nitrogen oxides, the product of this neutralization will have little effect on the total ratio of nitrites to nitrates. The neutralized slurry is then fed through line 43 to an evaporator 44 where it is heated by a steam coil to drive off water vapor and produce the desired product concentration of calcium nitrite in stream 45.

The calcium nitrite produced in the scrubbing tower 35 also contains a relatively high ratio of nitrates to nitrites. Since, however, the tower 35 operates at a very high ratio of slurry to nitrogen oxide gases, the liquid coming out of the tower contains only a minor proportion of nitrates and nitrites. Accordingly, it is preferred that this slurry be directed into incoming slurry stream 19 of the absorption section 10.

Figure 2:
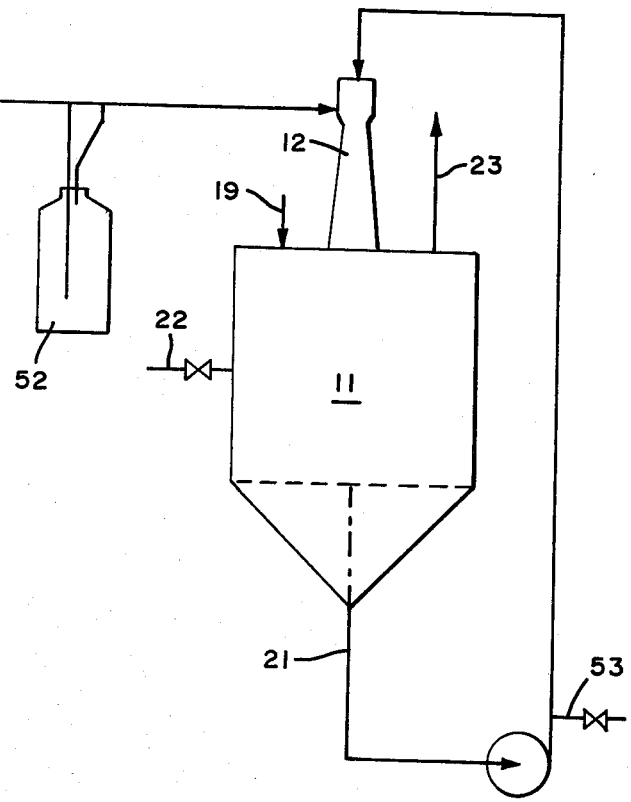
FIG. 2 is a schematic view of a single absorption reactor according to the present invention.

Referring to FIG. 2, a small reactor is shown with inlet configuration of the type suitable for use as reactor 11 in the system of FIG. 1. FIG. 2 also illustrates the laboratory system used for some of the Examples.

A lime slurry of the appropriate strength was charged to reactor 11 at the top (corresponding to stream 19 for continuous operation). The lime slurry was recirculated from the bottom of reactor 11 in stream 21 to the Venturi 12. Incoming nitrogen oxide gases, as produced in a conventional ammonia oxidation system, flowed in stream 20 through gas cooler 50 (which may or may not be used to achieve the desired "percent state of oxidation") to the inlet of Venturi 12. In Venturi 12 the recirculated slurry contacts and quickly quenches the incoming nitrogen oxide gases.

For small scale operations where the retention time of the nitrogen oxide gases in stream 20 is greater than about 0.3 of a second, oxidation of NO takes place and results in a ratio of $NO/NO_2$ of less than 1. This leads to production of an undesirable amount of byproduct calcium nitrate. In the Examples cooling water was introduced in stream 51 to gas cooler 50 to condense water from the nitrogen oxide gas stream 20. The condensed water absorbed $NO_2$ and resulted in the formation of nitric acid which was collected in condensate trap 52. This resulted in increasing the ratio of $NO/NO_2$ in the gas and decreases by-product calcium nitrate formation. It is believed that this ratio approximated 1 after condensing, but the ratio was not directly measured.

Gases left the reactor 11 in stream 23. When each batch was finished the nitrogen oxide gases and the slurry recirculation were shut off and the product was drained from reactor 11 in stream 53. In continuous operation, the product would be removed through overflow outlet 22.

In short batch reactions, a flat-bottomed reactor 11 was used as shown by the dotted lines in FIG. 2. For larger, continuous operations, a cone shaped bottom was used in place of the flat bottom as shown by solid lines in FIG. 2. When the flat bottomed reactor was tested for continuous operation, unacceptable levels of hydrated lime deposited on the flat surfaces of the bottom.

EXAMPLE I

Three runs were conducted using a feed of 59 grams/minute (0.13 lbs/minute) of slurry containing 15.7% $Ca(OH)_2$ and 0.05 $m^3$/min (1.75 $ft^3$/min) of a nitrogen oxide feed gas having about 9.6% nitrogen oxides at about a 50% "state of oxidation" as defined above. All gas volume measurements used herein are corrected from actual temperature and pressure to 0° C. and 1 atmosphere. All slurries were prepared from lime having 77% $Ca(OH)_2$ and 20% $CaCO_3$ except run A of Example III. The flow was as shown in FIG. 1 except that gas was fed from an ammonia oxidation system to Venturi 18 of fourth reactor 17, from fourth reactor 17 to Venturi 16 of third reactor 15, from third reactor 15 to Venturi 14 of second reactor 13 and from second reactor 13 to Venturi 12 of first reactor 11 and then vented from first reactor 11. This flow shall be referred to herein as "countercurrent flow". The flow of gas via streams 20, 23, 26 and 29 will be referred to herein as "cocurrent flow". In the three runs, the lime slurry feed was varied so that the calcium nitrite concentration was raised to about 20.8%, about 22.9% and about 23.7%.

The calcium nitrite, calcium nitrate and calcium hydroxide of the product from the fourth reactor (i.e. stream 31 in FIG. 1) was measured to be as follows, by weight percent:

| Run | Calcium Nitrite | Calcium Nitrate | Calcium Hydroxide | Calcium Nitrate Calcium Nitrate |
|-----|-----------------|-----------------|-------------------|---------------------------------|
| A   | 20.8            | 0.43            | 4.69              | 48.3                            |
| B   | 22.9            | 0.87            | 2.32              | 26.3                            |
| C   | 23.7            | 1.51            | 2.52              | 15.7                            |

The above illustrates the increase in undesired calcium nitrate production as the calcium nitrite content is caused to exceed about 22%.

EXAMPLE II

Three runs were performed with four reactors in series with countercurrent flow of lime slurry and gases (as described in Example I for section 10). Lime slurry having 15.3% $Ca(OH)_2$ was fed at a rate of 54.4 g/min (0.12 lbs/min) via stream 19 into the first reactor 11. A nitrogen oxide gas stream containing 9.0% nitrogen oxides was fed into Venturi 18 at a rate of 0.045 $m^3$/min (1.6 $ft^3$/min). The amount of excess lime in the crude product (stream 31) was varied by changing the concentration of $Ca(OH)_2$ in the lime slurry feed.

The calcium nitrite, calcium nitrate and calcium hydroxide of the crude product was measured to be as follows by weight percent.

| Run | Calcium Nitrite | Calcium Nitrate | Calcium Hydroxide | Calcium Nitrite Calcium Nitrate |
|-----|-----------------|-----------------|-------------------|---------------------------------|
| A   | 20.5            | 0.53            | 3.43              | 38.7                            |

-continued

| Run | Calcium Nitrite | Calcium Nitrate | Calcium Hydroxide | Calcium Nitrite Calcium Nitrate |
|---|---|---|---|---|
| B | 19.3 | 2.48 | 1.65 | 7.8 |
| C | 17.4 | 4.73 | 1.21 | 3.7 |

This Example illustrates the importance of maintaining at least about 2% calcium hydroxide in the slurry of the absorption reactors.

EXAMPLE III

Four runs were conducted with varying flow patterns. In run A a 152 mm (6 inch) diameter column with 2300 mm (7.5 ft) of 15.9 mm (⅝ inch) diameter ring packing was fed by a cocurrent flow of recirculated lime slurry and $NO_x$ gas. The slurry recirculation rate was 23.6 kg/min (52 lb/min). The feed rates were 0.05 m³/min (1.75 ft³/min) of gases containing 8.8% $NO_x$ and 59 g/min (0.13 lb/min) of lime slurry containing 14.7% $Ca(OH)_2$ prepared from a lime having 96% $Ca(OH)_2$ and 1% $CaCO_3$. In run B a single Venturi reactor as shown in FIG. 2 was fed with slurry containing 14.2% $Ca(OH)_2$ (prepared from the higher carbonate lime) through inlet stream 19 and 9.4% $NO_x$ gas through inlet stream 20 at respective rates of 36.3 g/min (0.08 lbs/min.) and 0.05 m³/min (1.75 ft³/min). In run C a series of four Venturi reactors as described in Example I were fed by countercurrent flows of slurry containing 15.2% $Ca(OH)_2$ at 63.5 g/min (0.14 lbs/min) and 9.6% nitrogen oxide gas at 0.05 m³/min (1.75 ft³/min). The recycle rates for the reactors were 30.5 kg/min (67.3 lbs/min) in stream 21, 7.5 kg/min (16.6 lbs/min) in stream 24, 9.7 kg/min (21.4 lbs/min) in stream 27 and 8.1 kg/min (17.8 lbs/min) in stream 30. In run D a series of four Venturi reactors as illustrated in section 10 of FIG. 1 were fed with 54.4 g/min (0.12 lbs/min) of lime slurry containing 14.8% $Ca(OH)_2$ through stream 19 and 0.05 m³/min (1.75 ft³/min) of 8.6% nitrogen oxide gases through stream 20. The crude product streams were measured as follows by weight percent:

| Run | Calcium Nitrite | Calcium Nitrate | Calcium Hydroxide | Calcium Nitrite Calcium Nitrate |
|---|---|---|---|---|
| A | 20.3 | 0.42 | 2.44 | 48.3 |
| B | 20.3 | 0.79 | 3.42 | 25.6 |
| C | 20.8 | 0.43 | 4.69 | 48.3 |
| D | 19.7 | 0.24 | 3.79 | 81.9 |

EXAMPLE IV

Using the apparatus of FIG. II, calcium nitrite was prepared in a batch process with 11.2 kg (24.7 lbs) of lime slurry containing 15.8% $Ca(OH)_2$ charged to reactor 11, 9.5% nitrogen oxide gases fed through inlet stream 20 at the rate shown and slurry was recirculated by the pump through stream 21 at a rate of 30.5 kg/min (67.3 lb/min) to achieve the ratios and produce the crude product compositions shown below:

| Run | Feed Rate of gases m³/min (ft³/min) | Molar Ratio $Ca(OH)_2$/$NO_x$ | % Calcium Nitrite | % Calcium Nitrate | % Calcium Hydroxide | Nitrite Nitrate |
|---|---|---|---|---|---|---|
| A | .07 (2.5) | 47 | 19.7 | 0.83 | 3.40 | 23.7 |
| B | .05 (1.75) | 95 | 21.0 | 0.39 | 4.86 | 53.9 |
| C | .028 (1.0) | 132 | 20.5 | 0.41 | 3.85 | 50.1 |

EXAMPLE V

To show the effect of retention time of the nitrogen oxide gases in the feed line (and hence the percent state of oxidation), run B of Example IV was compared to a similar run D with the gases purposely retained in the feed lines:

| Run | Retention Time In Seconds | Calcium Nitrite Wt. % | Calcium Nitrate Wt. % | Calcium Hydroxide Wt. % | Nitrite Nitrate |
|---|---|---|---|---|---|
| B | 1.2 | 21.0 | 0.39 | 4.86 | 53.9 |
| D | 3.56 | 20.8 | 0.67 | 3.54 | 31.1 |

EXAMPLE VI

Using the absorption system section 10 of FIG. 1, 0.05 m³/min (1.75 ft³/min) of feed gases containing about 9% nitrogen oxide was fed through stream 20 and 59 g/min (0.13 lb/min) of lime slurry containing 14.7% $Ca(OH)_2$ was fed through stream 19. The following represents the nitrogen oxide content of the emissions from each reactor:
From first reactor 11 (stream 23) about 4 1 volume %;
From second reactor 13 (stream 26) about 2.7 volume %;
From third reactor 15 (stream 29) about 2.0 volume %;
From fourth reactor 17 (stream 32) about 1.5 volume %.

The system was then connected to packed tower 35 with slurry fed into the tower 35 and then via stream 19 to first reactor 11. Gases from stream 32 were fed directly into the tower 35 and then vented. The vented gases were about 0.4 volume % nitrogen oxide gases (4000 ppm). This represents an unacceptable emission level.

The system was then reconnected as shown in sections 10 and 33 of FIG. 1 with a holding tank 34 connected between stream 32 and scrubbing tower 35. Retaining the gases in tank 34 for an average of four minutes, the emissions vented from scrubbing tower 35 were reduced to about 0.02 volume % nitrogen oxide gases (200 ppm) or less.

EXAMPLE VII

Two crude products from which undissolved calcium hydroxide had been removed were split into five samples (A, B and C from one product, D and E from another). Samples B, C and E were neutralized with the acid gases $CO_2$, $N_2O_3$ and mixed nitrogen oxide gases (percent of oxidation about 50%) to pH 10. Each sample was then concentrated to about 30% calcium nitrite. The product was then analyzed as follows:

| Run | Gas | pH | $Ca(NO_2)_2$ Wt % | $Ca(NO_3)_2$ Wt % | $Ca(OH)_2$ Wt % | $Ca(NO_2)_2$/$Ca(NO_3)_2$ | Precipitate |
|---|---|---|---|---|---|---|---|
| A | — | 11.2 | 31.6 | 0.68 | 0.59 | 46.5 | yes |

-continued

| Run | Gas | pH | Ca(NO$_2$)$_2$ Wt % | Ca(NO$_3$)$_2$ Wt % | CA(OH)$_2$ Wt % | $\frac{Ca(NO_2)_2}{Ca(NO_3)_2}$ | Precipitate |
|---|---|---|---|---|---|---|---|
| B | CO$_2$ | 10.0 | 29.0 | 0.63 | 0.49 | 46.0 | no |
| C | N$_2$O$_3$ | 10.0 | 30.1 | 0.73 | 0.46 | 41.3 | no |
| D | — | 11.4 | 31.8 | 0.64 | 0.57 | 49.7 | yes |
| E | NO$_x$ | 10.0 | 29.9 | 0.66 | 0.40 | 45.3 | no |

This Example illustrates that neutralization with an acid gas can prevent precipitation of the mixed salt (Ca(NO$_2$)$_2$·CaO·3½ H$_2$O) during concentration without substantially decreasing the nitrite to nitrate ratio, even though the bulk neutralization with NO$_x$ gases itself produces a high proportion of nitrates to nitrites under these conditions of high nitrite and low calcium hydroxide.

EXAMPLE VIII

Using the absorption section 10 and scrubbing section 33 of the system of FIG. 1, lime slurry containing 14.7% Ca(OH)$_2$ was fed from make-up tank 36 into the packed scrubbing tower 35 at a rate of 3.59 kg/hr (7.91 lbs/hr) containing 0.526 kg/hr (1.16 lbs/hr) of Ca(OH)$_2$. Feed gas containing 9.23 volume % nitrogen oxides at 37.3° C. (after cooling to condense HNO$_3$) was fed into first Venturi 12 via line 20 at 0.05 m$^3$/min (1.75 ft$^3$/min). Using the following rate for slurry recycle through streams 21, 24, 27 and 30, crude slurry was produced at stream 31 as shown in the table. Recycle was 30.5 kg/min (67.3 lbs/min) in stream 21, 7.5 kg/min (16.6 lbs/min) in stream 24, 9.7 kg/min (21.4 lbs/min) in stream 27 and 8.1 kg/min (17.8 lbs/min) in stream 30. Additionally, the calcium nitrite, calcium nitrate and calcium hydroxide contents of streams 22, 25, 28 and 31 were measured at the beginning of the run and at the end of a 28.6 hour run:

| | Stream 22 | | Stream 25 | | Stream 28 | | Stream 31 | |
|---|---|---|---|---|---|---|---|---|
| | Begin | End | Begin | End | Begin | End | Begin | End |
| % Ca (NO$_2$)$_2$ | 14.8 | 15.3 | 18.0 | 17.2 | 19.3 | 19.2 | 20.0 | 19.9 |
| % Ca (NO$_3$)$_2$ | 0.77 | 0.94 | 0.83 | 0.89 | 0.86 | 0.91 | 0.90 | 0.91 |
| % Ca (OH)$_2$ | 5.02 | 6.78 | 3.64 | 5.86 | 2.72 | 4.71 | 2.37 | 3.85 |
| Nitrite/Nitrate | 19.2 | 16.3 | 21.7 | 19.3 | 22.4 | 21.1 | 22.2 | 21.9 |

The slurry in stream 19 from the packed tower 35 to first absorber 11 contained 4.15% Ca(NO$_2$)$_2$, 0.6% Ca(NO$_3$)$_2$ and 12.1% Ca(OH)$_2$ at the beginning (a 6.9 nitrite/nitrate ratio) and 4.07% Ca(NO$_2$)$_2$, 0.6% Ca(NO$_3$)$_2$ and 12.5% Ca(OH)$_2$ at the end (a 6.8 nitrite/nitrate ratio). The exit gases from the tower 35 contained only 0.019% nitrogen oxide by volume during the run (190 ppm NO$_x$). The above numbers were obtained by direct measurements which represent a 93.3% utilization of nitrogen oxides to Ca(NO$_2$)$_2$, a 97.1% accountability of nitrogen oxides and a 102.5% accountability of Ca(OH)$_2$. Some calcium carbonate reaction would account for the excess accountability of Ca(OH)$_2$.

EXAMPLE IX

Using the absorption section 10 only of the system of FIG. 1, the first absorber 11 was fed via line 19 with 3.1 kg/hr (6.9 lbs/hr) of lime slurry contaning 14.8% Ca(OH)$_2$ for a 462.7 g/hr (1.02 lbs/hr) feed rate of Ca(OH)$_2$. A feed gas containing 8.6 volume percent nitrogen oxides was fed into first Venturi 12 at 0.05 m$^3$/min (1.75 ft$^3$/min), at 37.2° C. (after cooling to condense HNO$_3$). The slurry recycle rates were approximately the same as in Example VIII. Slurry in reactors 11, 13, 15 and 17 were analyzed at the beginning and end of the 17.5 hour run as follows:

| | Reactor 11 | | Reactor 13 | | Reactor 15 | | Reactor 17 | |
|---|---|---|---|---|---|---|---|---|
| | Begin | End | Begin | End | Begin | End | Begin | End |
| % Ca (NO$_2$)$_2$ | 14.1 | 14.6 | 16.7 | 16.7 | 18.3 | 18.3 | 19.8 | 19.4 |
| % Ca (NO$_3$)$_2$ | <0.1 | <0.1 | 0.12 | 0.13 | 0.16 | 0.16 | 0.17 | 0.24 |
| % Ca (OH)$_2$ | 7.87 | 7.66 | 6.10 | 6.46 | 4.71 | 4.82 | 3.76 | 4.60 |
| Nitrite/Nitrate | — | — | 139 | 128 | 114 | 114 | 116 | 81 |

The product slurry in stream 31 3.13 kg/hr (6.89 lbs/hr) contained 19.7% Ca(NO$_2$)$_2$, 0.24% Ca(NO$_3$)$_2$ and 3.79% Ca(OH)$_2$ for an 81.9 nitrite/nitrate ratio. The emissions through stream 32 were 1.6 volume % NO$_x$ gases, a generally unacceptable level. This Example represents an 81.9% utilization of nitrogen oxides to calcium nitrite, a 99.8% accountability of nitrogen oxides and a 95.9% accountability of Ca(OH)$_2$.

What is claimed is:

1. A process of producing an aqueous calcium nitrite solution low in calcium nitrate comprising the steps of:
   (a) feeding an aqueous lime slurry of about 10–20 weight percent calcium hydroxide to at least two absorption reactors in series;
   (b) feeding into the first absorption reactor a gaseous mixture of nitrogen oxide gases having a percent state of oxidation of about 40–50% according to the formula $$\text{percent state of oxidation} = \frac{\text{mols } eNO_2}{\text{mols NO + mols } eNO_2} \times 100$$

where eNO$_2$ is determined by adding two times the number of mols of N$_2$O$_4$ to the number of mols of NO$_2$;
   (c) feeding the gaseous effluent from each absorption reactor to the next absorption reactor in cocurrent flow with the lime slurry;
   (d) contacting the inlet gas of each absorption reactor with lime slurry at a rate wherein the local molar ratio of calcium hydroxide to nitrogen oxides is at least about 20; and
   (e) maintaining at least about 2 weight percent calcium hydroxide and below about 22 weight percent calcium nitrite in the slurry in each absorption reactor.

2. The method of claim 1 further comprising the steps:
   (f) removing undissolved calcium hydroxide from the effluent slurry from the last reactor to form a crude product solution of about 15–22 weight percent calcium nitrite;
   (g) neutralizing dissolved calcium hydroxide in the crude product solution with an acid gas selected from CO$_2$, N$_2$O$_3$ or mixed nitrogen oxide gases having a percent oxidation of about 50% to lower the pH to below about 10; and (h) concentrating the neutralized crude product solution to form a finished product of at least about 25 weight percent calcium nitrite.

3. The method of claim 2 wherein the crude product is neutralized with a gaseous mixture of nitrogen oxides.

4. The method of claim 3 wherein the crude product solution contains about 18 to 22 weight percent calcium nitrite.

5. The method of claim 2 wherein the finished product is an aqueous solution of about 30 to 50 weight percent calcium nitrite.

6. The process of claim 1 wherein each absorption reactor includes an inlet Venturi, wherein gases are fed into each reactor at the inlet Venturi, and wherein slurry is recycled from each reactor to the inlet Venturi of said reactor at a rate sufficient to provide said local molar ratio of calcium hydroxide to nitrogen oxides of at least about 35.

7. The process of claim 6 wherein the local molar ratio of calcium hydroxide to nitrogen oxides is between about 50 and about 150.

8. The process of claim 1 wherein the lime slurry fed into the first reactor is about 13–15 weight percent calcium hydroxide and 0 to about 6 weight percent calcium carbonate.

9. The process of claim 8 wherein the lime slurry fed into the first reactor contains 0 to about 0.5 weight percent calcium carbonate.

10. The method of claim 1 wherein the gaseous effluent from the last absorption reactor is retained to increase the percent state of oxidation and is then scrubbed with lime slurry to below about 500 ppm nitrogen oxides.

* * * * *

UNITED STATES PATENT AND TRADEMARK OFFICE
CERTIFICATE OF CORRECTION

PATENT NO. : 4,285,923
DATED : August 25, 1981
INVENTOR(S) : S. L. Bean et al.

It is certified that error appears in the above-identified patent and that said Letters Patent are hereby corrected as shown below:

Col. 1, line 13: "enduses" should read -- end-uses --.
Col. 6, line 30: after "as" delete -- 37 --;
      line 31: before "cocurrent" insert -- " --;

Col. 8, line 6: after "(ft$^3$/min" insert -- ) --;
      line 35: after "4" delete -- 1 --;
      line 66: in formula, "CA" should read -- Ca --.
Col. 9, line 2: in formula, "CA" should read -- Ca --;

Signed and Sealed this

Fifteenth Day of December 1981

[SEAL]

Attest:

GERALD J. MOSSINGHOFF

*Attesting Officer*     *Commissioner of Patents and Trademarks*